United States Patent
DeJesus et al.

(10) Patent No.: US 9,307,869 B2
(45) Date of Patent: Apr. 12, 2016

(54) INTEGRATED BONDING FLANGE SUPPORT DISK FOR PREFABRICATED SHOWER TRAY

(71) Applicant: MGNT Products Group, LLC, Charlotte, NC (US)

(72) Inventors: William M DeJesus, Charlotte, NC (US); Peter Nielsen, Purcellville, VA (US); Larry Meyers, Layton, UT (US)

(73) Assignee: MGNT PRODUCTS GROUP LLC, Charlotte, NC (US)

( * ) Notice: Subject to any disclaimer, the term of this patent is extended or adjusted under 35 U.S.C. 154(b) by 337 days.

(21) Appl. No.: 13/934,284

(22) Filed: Jul. 3, 2013

(65) Prior Publication Data

US 2014/0317841 A1    Oct. 30, 2014

Related U.S. Application Data

(60) Provisional application No. 61/816,342, filed on Apr. 26, 2013.

(51) Int. Cl.
| | |
|---|---|
| *A47K 3/00* | (2006.01) |
| *A47K 3/40* | (2006.01) |
| *E04B 1/64* | (2006.01) |
| *E04B 1/66* | (2006.01) |
| *E03F 5/04* | (2006.01) |
| *E04F 15/02* | (2006.01) |

(52) U.S. Cl.
CPC ............... *A47K 3/40* (2013.01); *E03F 5/0407* (2013.01); *E03F 5/0408* (2013.01); *E04B 1/64* (2013.01); *E04B 1/66* (2013.01); *E04F 15/02188* (2013.01)

(58) Field of Classification Search
CPC ........................................................ A47K 3/04
USPC ....................................................... 4/596–614
See application file for complete search history.

(56) References Cited

U.S. PATENT DOCUMENTS

| | | |
|---|---|---|
| 4,551,870 A | 11/1985 | Presti, Jr. |
| 4,590,731 A | 5/1986 | DeGooyer |
| 5,095,667 A | 3/1992 | Ryan et al. |

(Continued)

FOREIGN PATENT DOCUMENTS

| | | |
|---|---|---|
| CA | 2689796 | 7/2010 |
| DE | 10131338 A1 | 9/2002 |

(Continued)

OTHER PUBLICATIONS

International Search Report of PCT/US2014/035254 mailed Aug. 5, 2014.

(Continued)

*Primary Examiner* — Lori Baker
(74) *Attorney, Agent, or Firm* — Parsons Summa

(57) ABSTRACT

A combination for plumbing fixtures, particularly tiled floors with drains, is disclosed along with a method for building a tile floor using the combination. An exemplary combination includes a substantially planar shower tray bonding disk on a flooring substrate and surrounded by a prefabricated polymer foam shower tray on the flooring substrate and at the circumference of the bonding disk. The disk includes an interior rim that defines a drain opening and a plurality of slotted openings for permitting mortar to penetrate the disk. The drain opening in the disk can thus be positioned at a drain cut out in the flooring substrate.

7 Claims, 5 Drawing Sheets

(56) References Cited

U.S. PATENT DOCUMENTS

| | | |
|---|---|---|
| 7,410,608 B1 | 8/2008 | Gohlke |
| 7,992,236 B2 | 8/2011 | DeGooyer |
| 8,060,956 B2 | 11/2011 | DeGooyer |
| 8,112,827 B2 | 2/2012 | DeGooyer et al. |
| 2005/0017384 A1 | 1/2005 | Tamai |
| 2009/0113621 A1 | 5/2009 | DeGooyer et al. |
| 2011/0308008 A1 | 12/2011 | DeGooyer |
| 2013/0160203 A1 | 6/2013 | DeGooyer et al. |
| 2014/0317841 A1 | 10/2014 | DeJesus |
| 2014/0319833 A1 | 10/2014 | DeJesus |

FOREIGN PATENT DOCUMENTS

| | | |
|---|---|---|
| DE | 102004025571 A1 | 12/2005 |
| DE | 102005020200 A1 | 11/2006 |
| DE | 202006014440 U1 | 2/2007 |
| DE | 202006019814 | 5/2007 |
| DE | 202008011354 U1 | 2/2010 |
| DE | 102011018518 | 9/2012 |
| EP | 0481938 | 4/1992 |
| EP | 0860559 | 8/1998 |
| EP | 1296000 | 3/2003 |
| EP | 1540872 | 2/2005 |
| EP | 1743756 | 1/2007 |
| EP | 2177677 | 4/2010 |
| EP | 2206456 | 7/2010 |
| EP | 2248957 A1 | 11/2010 |
| EP | 2466023 A1 | 6/2012 |
| GB | 1451824 | 10/1976 |
| JP | 6025719 | 2/1985 |
| JP | 2007016520 | 1/2007 |
| JP | 2007160942 A | 6/2007 |
| WO | 2014176399 | 10/2014 |
| WO | 2014176402 | 10/2014 |

OTHER PUBLICATIONS

International Search Report of PCT/US2014/035249 mailed Dec. 16, 2014.

Copending U.S. Appl. No. 13/934,304 for Double Fabric Faced Injection Molded Fixture filed Jul. 3, 2013.

Schluter-Shower System Installation Handbook 2012-2013; Dec. 2012; 40 pgs.

INTEGRATED BONDING FLANGE SUPPORT DISK FOR PREFABRICATED SHOWER TRAY

RELATED APPLICATIONS

This application is related to copending application Ser. No. 13/934,304 filed concurrently herewith for "Double Faced Bond Flange Fixture."

BACKGROUND

The invention relates to a structural piece used in combination with other structural pieces to form the ceramic tile floor of a shower or similar bathroom structure.

In wood-frame construction, ceramic tile shower floors are typically formed by first putting a moisture barrier over a wooden subfloor after which a mortar bed is sloped to the position of the drain, typically referred to as sloped fill, or "pre-slope." A waterproof barrier, commonly referred to as a shower pan liner, is subsequently positioned over the sloped mortar bed and fixed to the drain. Conventional shower pan liners are not designed to bond to a substrate or to ceramic or stone tile and thus a second "floating" (non-bonded) mortar bed must be overlaid to provide a load distribution layer and bonding surface for the tile. To have sufficient strength, such non-bonded mortar beds for shower floors should have a minimum thickness (typically 1.5 inches) and should be reinforced with galvanized wire mesh to comply with industry standard guidelines.

Most such shower floors are sloped, and typically at a value of one-quarter inch (¼") per foot. As a result, the position of the drain, the desired slope, and the length of sloped tile, all combine to define a height difference between the drain and the floor's perimeter (e.g., a wall, a curb, or a barrier-free entry).

This method of shower floor construction has proven over time to be reliable when properly built, but requires a high degree of trade knowledge and skill, and takes considerable time.

For a number of reasons, including consumer preferences, a desired increase in construction simplicity, and (in some cases) the unavailability of craftsmen who can carry out the conventional methods, the industry is moving toward simplified construction systems and methods, and toward simpler, cleaner and "open look" interior spaces. One trend is toward low profile shower curbs and toward eliminating perimeter curbs entirely.

To facilitate these trends, integrated systems have recently been developed that use lighter materials, and simplified installation methods that make lower profile shower floor construction both possible and less time-consuming. Much of this progress has been made possible with the advent of a new generation of materials that allow each layer of the structure to be bonded to the adjacent layer(s). In some cases these systems include a prefabricated shower bed tray (typically formed of polymer foam) which is mortar bonded to the subfloor. In some systems, a mortar bondable waterproofing membrane is fixed to the foam tray with thin set mortar. The tile is then bonded over the membrane, again using thin set mortar. Thus, a typical integrated system could include (in order) substrate/initial mortar layer/shower tray/second mortar layer/membrane/third mortar layer/tile.

As an additional consideration, the shower tray and its surrounding area must be flush with one another so that a level layer of tile can be placed upon it. To the extent that the shower tray is relatively thick at its perimeter, the surrounding areas must likewise be built up to match the tray perimeter. At the same time, the physical nature of the polymer foam tends to establish about one-half inch (0.5") as the minimum thickness of the foam tray anywhere—including its thinnest portions at the drain.

As a result, the half-inch thickness of the tray at the drain must increase toward the perimeter to provide the ¼" per foot slope. In turn, any area surrounding the tray perimeter must be made thicker to remain flush with the tray perimeter.

Thus, a thinner tray perimeter is desired, but this goal is limited (or in some cases frustrated) by the necessary thickness for the tray at the drain.

At the position where the shower drain is required, the flooring structure, including the shower tray and related portions of the integrated system, must be sufficiently strong to support the drain while still allowing the tile to be placed over the nearby foam tray and around the drain. Conventionally, this has required a relatively thick tray or relatively thick mortar, either of which in turn adds to the thickness of the overall floor structure and affects its relative height compared to the remainder of the area. Such additional thickness can be disadvantageous in many circumstances, including barrier-free shower enclosures (i.e., without any curbing).

In "fitting" a barrier free-construction within the thickness of typical subfloor panels, it is relatively easy to recess the subfloor panels in the footprint of the shower floor such that they are flush with the tops of the floor joists and without damaging those joists. The harder task is to compensate for the height difference between the recessed subfloor panels in the footprint of the shower floor and the adjacent subfloor (typically 0.75 inches).

Conventional shower floor constructions, and even the newer "integrated systems", are often too tall (e.g., too thick) to "fit" within a ¾"-thick subfloor panel. Obtaining a flush, barrier free entry thus requires one or more of the following options: cutting or notching the framing members (which typically is a building code violation), having a very tall threshold at the entrance to the bathroom as a result of building up the floor adjacent to the shower floor to make it flush with the shower floor; ramping up to and around the shower floor; or providing an "engineered" solution such as cutting and heading off the joists in the area of the shower floor and subsequently lowering the subfloor/framing structure in the area of the shower floor. Such engineered solutions require extensive work, are costly and, in most cases, must be included in the design phase of the house. For practical reasons, this excludes most remodels and retrofits.

As a result, conventional shower floor constructions, including the newer "integrated systems" are taller (thicker) to provide support for the assembly or, in the case of the newer "integrated systems," the drain.

SUMMARY

In one aspect, the invention is a combination for plumbing fixtures that includes a substantially planar shower tray bonding element and a prefabricated foam shower tray surrounding the planar bonding element at the perimeter of the bonding element.

In another aspect, the invention is a combination for plumbing fixtures that includes a substantially planar shower tray bonding disk on a flooring substrate and surrounded by a prefabricated polymer foam shower tray on the flooring substrate and at the circumference of the bonding disk. The disk includes an interior rim that defines a drain opening and a plurality of slotted openings for permitting mortar to penetrate the disk. The drain opening in the disk is positioned at a drain cutout in the flooring substrate.

In yet another aspect, the invention is a method of building a tiled floor with a drain. The method includes the steps of positioning a substantially planar shower tray bonding element that defines a drain opening over a drain cutout in a flooring substrate, mortaring the planar shower tray bonding element in position over the drain opening cutout, and positioning a polymer foam shower tray on the same flooring substrate and in surrounding relationship to the perimeter of the planar shower tray bonding element.

The foregoing and other objects and advantages of the invention and the manner in which the same are accomplished will become clearer based on the following detailed description taken in conjunction with the accompanying drawings.

DETAILED DESCRIPTION

The bonding flange support disk of the present invention provides a reliable way to provide solid support for a drain in relatively thin assemblies, such as barrier-free shower installations in wood-frame construction while compensating for the difference (typically ¾") between the recessed subfloor of the shower footprint and the adjacent subfloor.

For purposes of illustration and clarity, the invention herein is described in terms of a floor for a bathroom shower. The skilled person will recognize, however, that the invention has advantages with respect to other barrier free enclosures where additional thickness in the floor structure can be disadvantageous.

Figure 1:
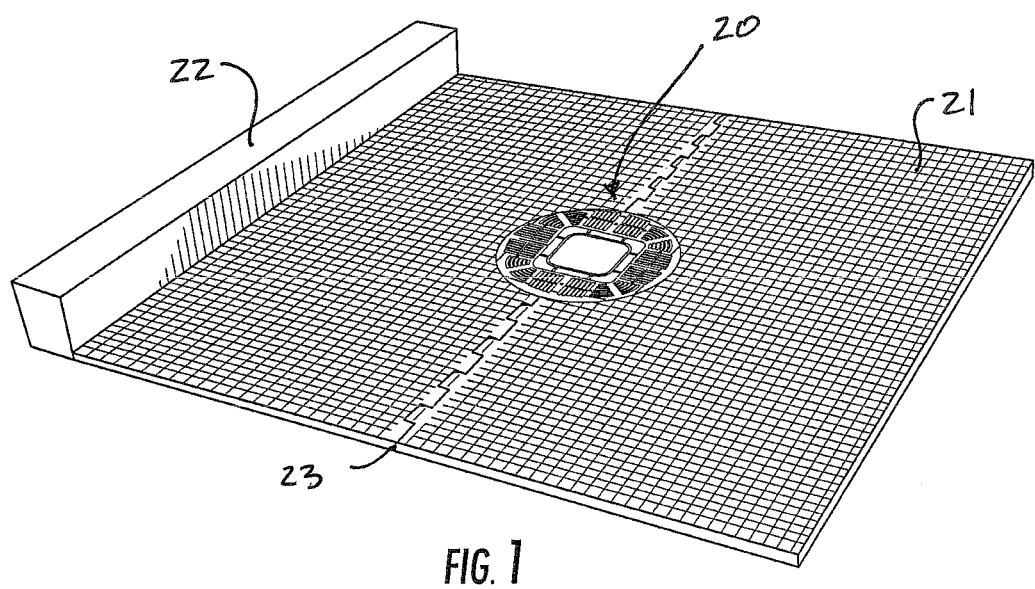
FIG. 1 is a perspective view of the shower tray bonding disk of the invention in the context of a foam shower tray and a curb.

FIG. 1 is a perspective view of the shower tray bonding element 20 which in exemplary embodiments is in the shape of a disk. The disk 20 is positioned in context in combination with a foam shower tray 21 and adjacent a shower curb 22. The disk shape is a convenient design choice rather than an absolute requirement. In the illustrated embodiment, and as is common for ease of installation in some circumstances, the foam shower tray 21 is formed of two portions connected by a joint 23. As those familiar with such installations are well aware, the two-part construction helps permit the foam shower tray to be positioned on the substrate after a drain fixture is already in place.

Figure 2:
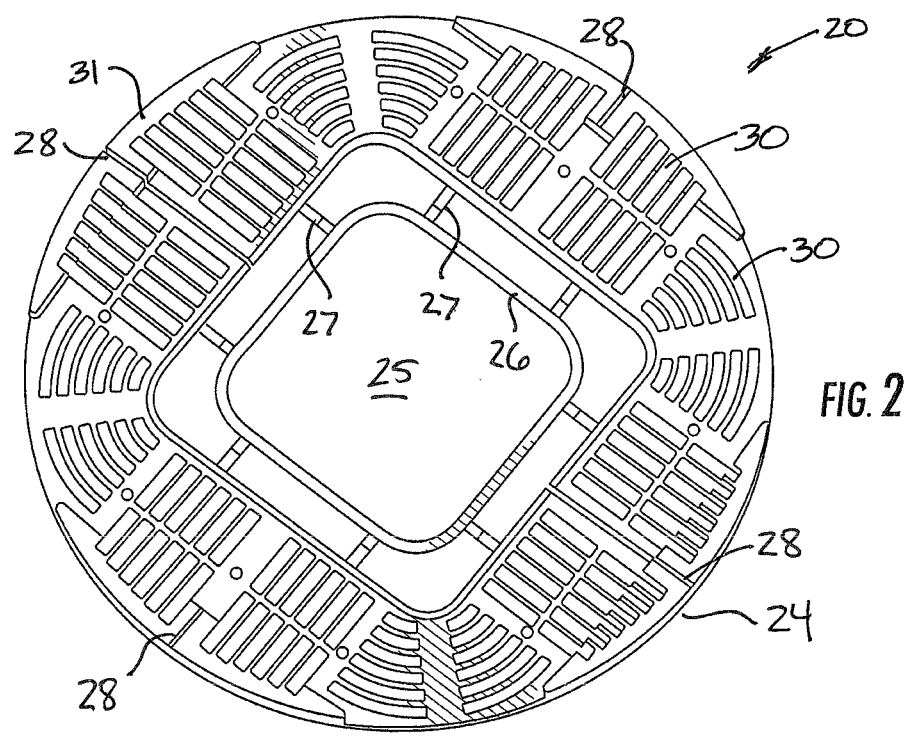
FIG. 2 is a top plan view of the shower tray bonding disk.

FIG. 2 is a top plan view of the shower tray bonding disk 20. The disk 20 defines a circumferential perimeter 24 and an interior rim 26 defines a drain opening 25. In the illustrated embodiment, the rim 26 is attached to the remainder of the shower tray bonding disk 20 by a plurality of ribs 27. For purposes of allowing thin set mortar to penetrate, the shower tray bonding disk 20 includes a plurality of slotted openings 30. In the illustrated embodiment, these include a plurality of arc-shaped slots and a plurality of rectangular slots, but again these shapes are preferred choices rather than limitations.

In particular, when the disk 20 is in position with a drain flange (e.g., 45 in FIG. 8), thin set mortar can easily be pushed into the openings 30 from the top surface to complete fill those openings. When the drain flange 45 is pressed in from the top, the mortar forms a boundary area between the bottom surface of the drain flange and the subfloor 41 to provide optimal bonding. Within the openings 30, the mortar forms vertical columns that are capable of supporting high compressive loads. Additionally, any mortar shrinkage is controlled by the width of the disk cell openings 30. In comparison, if thin set mortar alone were supporting the drain, normal mortar shrinkage would occur primarily in a vertical direction potentially causing the drain to tilt from a desired horizontal position. Using the invention, the disk 20 helps keep the drain in its set position and limits any mortar shrinkage to minimal lateral amounts within the openings 30. Thus, although thin set mortar does not bond to the disk material per se, the mortar can bond through the disk 20 to both the bottom of the drain flange 45 and the subfloor 41.

As background, "thin set mortar" refers to mortars that can be applied and that will function in their intended manner in thickness on the order of 0.25 inches (about 5 mm). In addition to the traditional combination of water, Portland cement, lime and sand, thin set mortar typically includes a polymer added as an additional component that increases the adhesion, toughness, flexibility, tensile strength, and chemical resistance of the overall composition. Representative polymer additives include ethylene vinyl acetates, polyvinyl alcohol, and various latex or epoxy compositions.

Figure 8:
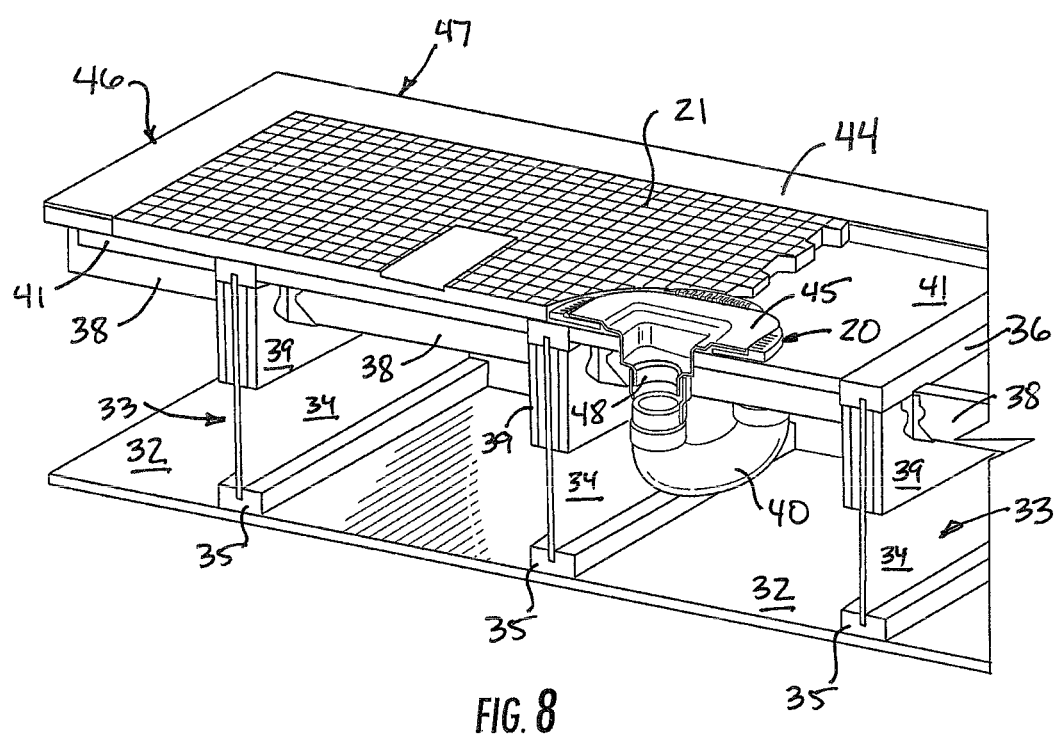
FIG. 8 is a perspective view of the shower tray bonding disk in position with a foam shower tray and a drain flange.

In the illustrated embodiment, the disk 20 includes raised portions 31 into which a drain flange can nest; e.g. element 45 in FIG. 8. The raised portions 31 also carry clock marks 28 that form a positioning system for the drain flange 45 (FIG. 8). The clock marks help position the drain opening either perpendicular or parallel to any adjacent wall so that tile can surround the drain while still being aligned with the walls.

The disk 20 can be formed of any material that has the required structural strength and that will avoid adverse reactions with any of the other materials typically used in shower construction; e.g. the thin set mortar, the polymer tray, or the membranes (where used). For a number of reasons, including strength, weight, and ease of manufacture, plastics (polymers) are quite effective and an appropriate plastic can be selected by persons skilled in the art without undue experimentation. Thermoplastic polymers suitable for injection molding tend to be convenient, relatively inexpensive, and widely available. Typical choices include (but are not limited to) acrylic, nylon, polyethylene, polypropylene, polystyrene, polyvinyl chloride, PTFE, polyester, polycarbonate, polyurethane and acrylolnitrile butadiene styrene (ABS).

Figure 3:
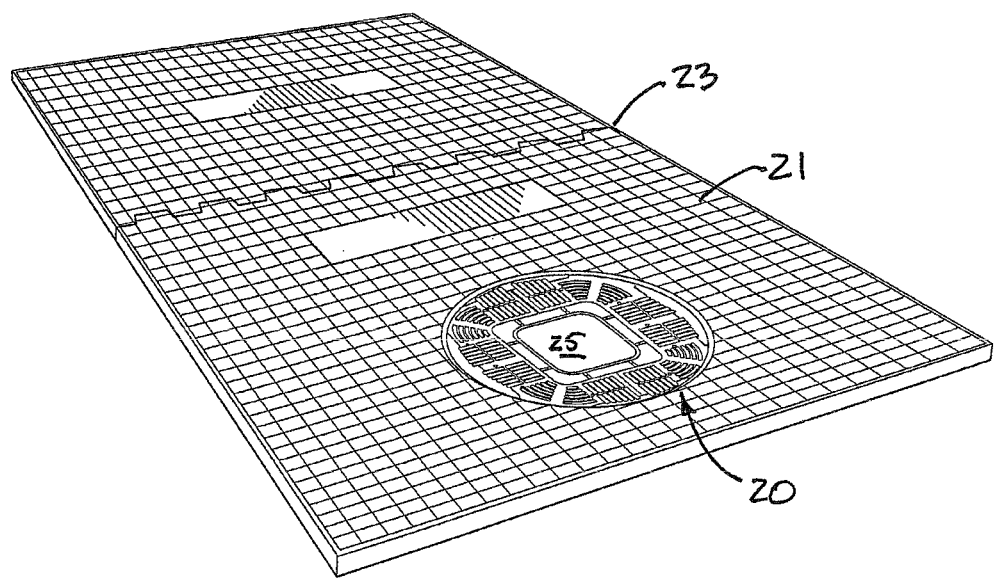
FIG. 3 is another perspective view of the shower tray bonding disk positioned with a shower tray.

FIG. 3 is another perspective view of the shower tray bonding disk again in the context of the shower tray 21 and the joint 23 defining the two portions of the tray 21. In typical modern shower construction, the shower tray 21 is formed of polymer foam with expanded polystyrene foam being one useful (but not limiting) choice. Polymer foams are typically made by adding a blowing agent and a nucleating agent to a polymer melt and then using the blowing and nucleating agents to generate the foam. In the context of a tile floor, the foam should be rigid (rather than compressible) and can be "closed cell" or "open cell." Accordingly the skilled person can select the foam and the foaming method on that basis and without undue experimentation. Polyurethane is another exemplary polymer often used to foam closed cell rigid foams.

Figure 4:
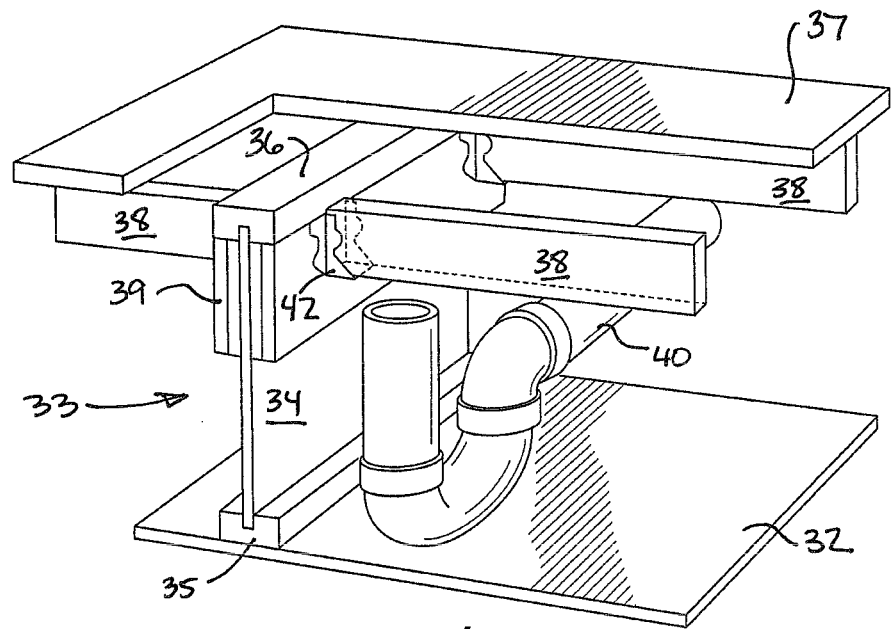
FIG. 4 is an environmental perspective view of portions of a shower construction.

The environmental views of FIGS. 4-8 illustrate some of the specific advantages of the invention. FIG. 4 is a perspective illustration of a relatively typical modern construction of the floor of the shower and its associated plumbing. FIG. 4 illustrates a lower base substrate 32 underneath an engineered wood joist 33. These structural elements are also referred to as an "I-joist" or an I-beam. The joist 33 is formed from a web 34 and respective flanges 35 and 36. The substrate 32 does not need to be load-bearing and in some circumstances can be the plasterboard ceiling of the next lower floor.

In general, such engineered wood joists have superior strength in relation to their size and weight, and can carry heavier loads with less lumber then a dimensional solid wood joist. Such engineered joists are becoming more common in new constriction and tend to eliminate problems (e.g., bowing, crowning, twisting, cupping, checking, splitting) associated with solid lumber joists. Such joists also have little or no shrinkage. Both the web and the flange can be formed from laminated veneer, plywood, or oriented strand board.

In order to maintain its integrity, properties and advantages, however, an engineered wood joist must be kept intact. As a result, trimming or cutting into the joist to provide or ease access to plumbing fixtures can have serious consequences and violates relevant building codes in most jurisdictions. As the figures illustrate, the invention helps the plumber or tile contractor (or both) reduce the difficulty and complexity of their tasks while keeping the joists intact.

The I-beam (and typically a plurality of I-beams) 33 carries a shower subfloor or substrate 37. A portion of plumbing 40 is likewise illustrated adjacent the joist 33 and between the shower subfloor 37 and the lower substrate 32. As the skilled person will appreciate, one of the advantages of the described structural systems is the capability to attach a fixture (e.g., a drain) to existing plumbing relatively easily while thereafter being aligned with tile that is not yet laid when the fixture is installed.

A typical structure will also include smaller joists 38 perpendicular to the engineered joist(s) 33. These smaller joists 38 are carried by hangers 42 that are fixed to the web 34 of the engineered joist 33 along with one or more reinforcing panels 39. For purposes of illustrating the overall construction, the reinforcing panels 39 are shown extending partially along the web 34. In most circumstances, however, one or more of the panels 39 will extend completely along and over the web 34.

Figure 5:
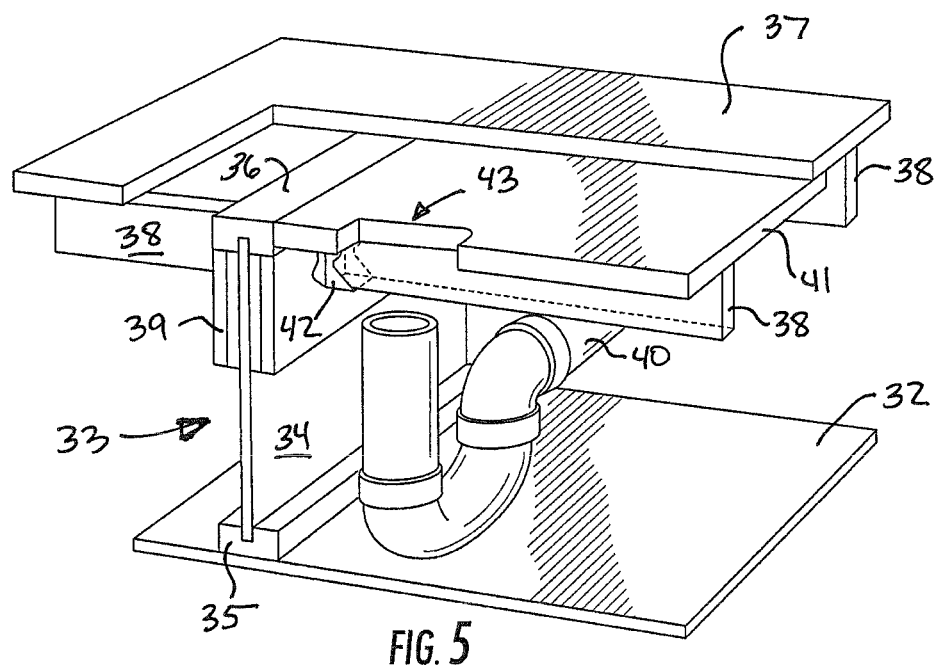
FIG. 5 is the same environmental view as FIG. 4, but with the added lower subfloor portion (substrate).

FIG. 5 illustrates the same structure environment, but with the addition of a lowered subfloor portion 41. The lowered subfloor portion 41 is attached to and supported by the engineered joists 33 and the perpendicular joists 38. The lowered subfloor portion 41 also includes a cut out portion 43 for the eventual drain.

Figure 6:
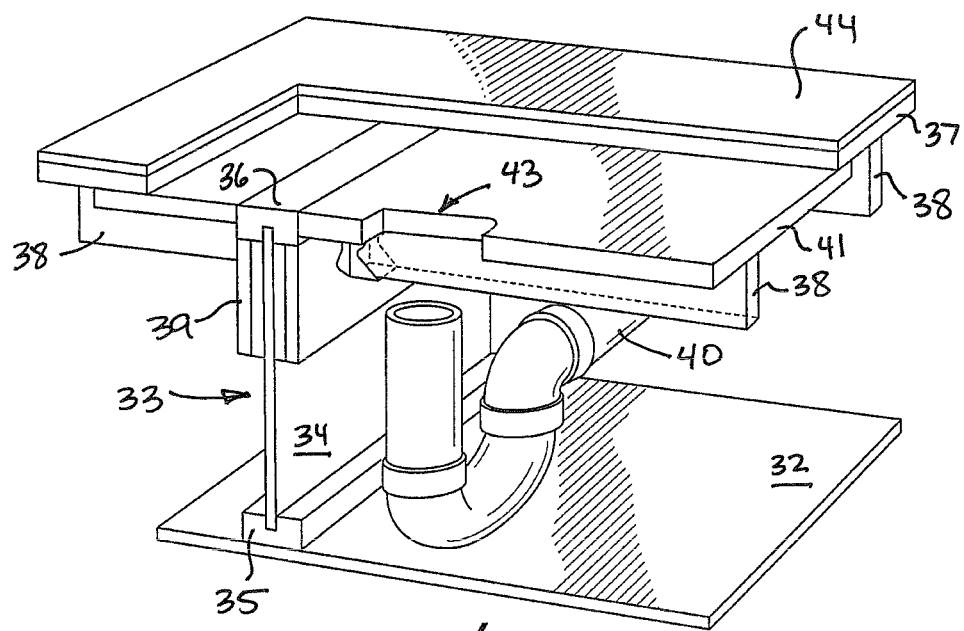
FIG. 6 is the same environmental perspective view as FIGS. 4 and 5, with the addition of the tile base material on a portion of the substrate.

FIG. 6 is the same environmental view as FIGS. 4 and 5, but showing the additional presence of a tile base layer 44 on the subfloor 37.

Figure 7:
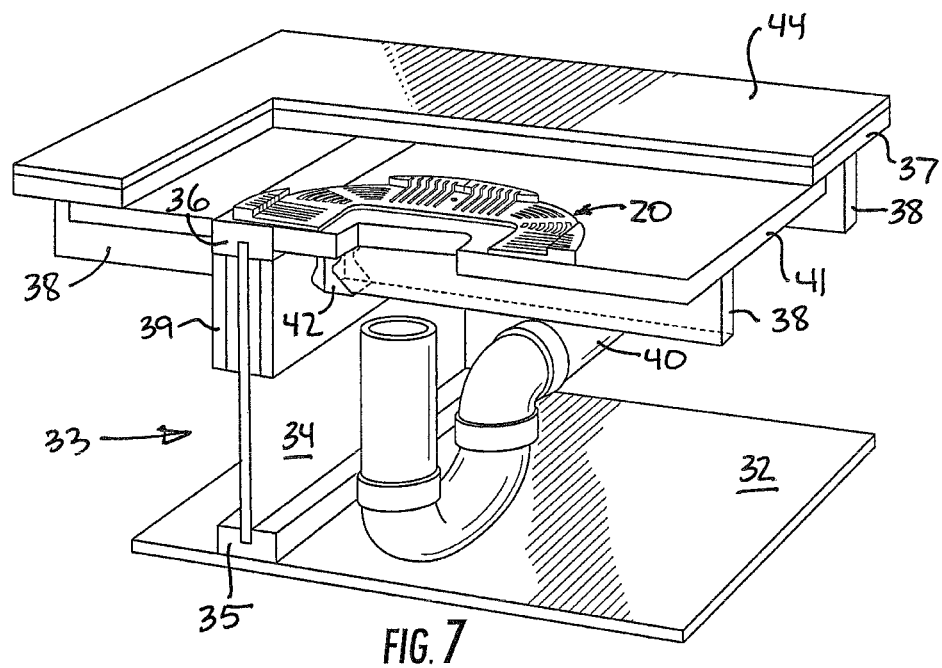
FIG. 7 is another progressive view in the sequence of FIGS. 4-6 and illustrates the shower tray bonding disk in position over the plumbing.

FIG. 7 is another identical view, but with the addition (in partial cross sectional and partial perspective manner) of the shower tray bonding disk 20 in position surrounding the drain cut out 43 and on the lower subfloor portion 41.

FIG. 8 illustrates a completed structure with the exception of the final layer of tile and the drain hardware. In particular, FIG. 8 illustrates a drain flange fixture 45 resting on the shower tray bonding disk 20. In exemplary embodiments, the raised portion 31 on the shower tray bonding disk 20 conform to the size and shape of the drain flange fixture 45. As a result, the drain flange fixture 45 can be quickly and easily positioned on the disk 20.

In the illustrated embodiment, the drain flange fixture 45 includes a depending nipple structure 48 that provides an easy connection to the plumbing 40. Basic pipe connections are well within the knowledge of the skilled person. Basically, the depending nipple 48 can be threaded or unthreaded and can accordingly be joined to the remainder of the plumbing 40 with a coupling or a threaded bushing or a slip threaded bushing (including reducing versions of any of these).

FIG. 8 also shows the foam shower tray 21 in position adjacent the shower tray bonding disk 20 and likewise adjacent the remainder of the tile base layer 44.

FIG. 8 also illustrates that the foam shower tray is inclined from the entry position (designated at 46) entry to the drain and from the lateral portion (designated at 47) to the drain. As a fundamental advantage of the invention, the shower tray bonding disk 20 provides additional structural stability at the drain. Without the shower tray bonding disk, the foam shower tray 21 would have to be thicker at the drain which in turn would require the tray to be even thicker at the both the entry position 46 and along the lateral portion 47 in order to provide the necessary incline from the edge to the drain. With the shower tray bonding disk 20 in place, the foam shower tray 21 can be thinner at all points, and thus thinner at both the entry position 46 and along the lateral portion 47.

Additionally, in the absence of the shower tray bonding disk 20 of the invention, the grout or mortar or both would have to be thicker at the drain fixture to support it.

The shower tray disk 20 provides an overall ease of construction using the foam shower tray system and likewise adds structural and construction convenience for both zero depth entry floors as well as shower floors that incorporate curbs.

As a result, in another aspect, the invention is a method of building a tiled floor with a drain. In this aspect, the method can include positioning a substantially planar shower tray bonding element that defines a drain opening over a drain cutout in a flooring substrate, mortaring the planar shower tray bonding element in position over the drain opening cutout, and positioning a polymer foam shower tray on the same flooring substrate and in surrounding relationship to the perimeter of the planar shower tray bonding element.

The method can also include the steps of mortaring the bonding element and the shower tray in position using thin set mortar.

The method can further include inserting a drain bond flange fixture into the drain cutout and over the planar bonding element with portions of the bond flange fixture overlying portions of the planar bonding element surrounding the drain cutout in the flooring substrate.

As a final or near final step, the method can include laying a tile floor over the foam tray and portions of the bond flange fixture.

In many circumstances, particularly using such integrated materials and techniques, the method can include adding a waterproofing membrane to the structural combination. In many cases the membrane is positioned over the foam tray before laying the tile floor. Membranes are available in sheet form, typically as variations of nonwoven fabrics. Examples include KERDI (Schulter Systems, L. P., Plattsburgh, N.Y. 12901), DUROCK (USG Corporation, Chicago, Ill. 60661) and TRUGARD™ (Truco Solutions, LLC, Alpharetta Ga. 30009). Alternatively, membranes can be applied as viscous liquids, suspensions or slurries that cure into the desired waterproofing layer. Examples include HYDRO BAN® (Lacticrete International Inc., Bethany, Conn. 06524) and REDGARD® (Custom Building produces, Inc., Seal Beach, Calif. 90740).

Finally (although not necessarily the final construction step), the method includes connecting the drain bond flange fixture to a drain pipe below the flooring substrate.

In the drawings and specification there have been set forth exemplary embodiments of the invention, and although specific terms have been employed, they are used in a generic and descriptive sense only and not for purposes of limitation, the scope of the invention being defined in the claims.

The invention claimed is:

1. A combination for plumbing fixtures comprising:
   a substantially planar shower tray bonding disk on a flooring substrate and surrounded by a prefabricated polymer foam shower tray on said flooring substrate and at the circumference of said bonding disk;
   said disk including an interior rim that defines a drain opening and a plurality of slotted openings for permitting mortar to penetrate the disk; and
   said drain opening in said disk being positioned at a drain cutout in said flooring substrate.

2. A combination for plumbing fixtures according to claim 1 further comprising a drain bond flange fixture resting on said disk and in said drain opening.

3. A combination according to claim 2 further comprising:
   a plumbing drain pipe beneath said drain cutout; and
   a connection between said bonding flange fixture and said plumbing drain pipe.

4. A combination according to claim 3 wherein said connector comprises a depending connector on said bonding flange and a receiving connector on said drain pipe.

5. A combination according to claim 4 wherein said receiving connector is a slip bushing.

6. A combination according to claim 1 wherein said polymer tray comprises expanded polystyrene foam.

7. A combination according to claim 1 wherein said disk is selected from the group consisting of acrylic, nylon, polyethylene, polypropylene, polystyrene, polyvinyl chloride, PTFE, polyester, polycarbonate, polyurethane and acrylolnitrile butadiene styrene.

\* \* \* \* \*